US012655927B2

(12) United States Patent
Choi

(10) Patent No.: US 12,655,927 B2
(45) Date of Patent: Jun. 16, 2026

(54) MULTIFUNCTIONAL DEVICE FOR REMOVING FILM FROM PIPE

(71) Applicant: DCSENG CO., LTD.,
Chungcheongbuk-do (KR)

(72) Inventor: In Sung Choi, Daejeon (KR)

(73) Assignee: DCSENG CO., LTD.,
Chungcheongbuk-do (KR)

( * ) Notice: Subject to any disclaimer, the term of this patent is extended or adjusted under 35 U.S.C. 154(b) by 229 days.

(21) Appl. No.: 18/580,869

(22) PCT Filed: Nov. 23, 2021

(86) PCT No.: PCT/KR2021/017239
§ 371 (c)(1),
(2) Date: Jan. 19, 2024

(87) PCT Pub. No.: WO2023/008657
PCT Pub. Date: Feb. 2, 2023

(65) Prior Publication Data
US 2024/0230012 A1     Jul. 11, 2024

(30) Foreign Application Priority Data
Jul. 27, 2021     (KR) ........................ 10-2021-0098592

(51) Int. Cl.
*F16L 55/18*          (2006.01)
*B23C 3/12*          (2006.01)
*B24B 9/00*          (2006.01)

(52) U.S. Cl.
CPC .............. *F16L 55/18* (2013.01); *B23C 3/122* (2013.01); *B24B 9/007* (2013.01)

(58) Field of Classification Search
CPC ........... B08B 9/02; B23C 3/122; B23C 3/007; B23C 3/12; B23C 3/124; B23K 37/0276;
(Continued)

(56) References Cited

U.S. PATENT DOCUMENTS 3,501,872 A     3/1970  Mighton
5,660,087 A *   8/1997  Rae ........................ E21B 19/168
                                                                  81/57.2
(Continued)

FOREIGN PATENT DOCUMENTS

CN          1605421 A      4/2005
CN        102328096 A      1/2012
(Continued)

OTHER PUBLICATIONS

Machine Translation of Seung (KR101389673B1), Generated by Espacenet, 2012 (generated Oct. 29, 2025) (Year: 2012).*
(Continued)

*Primary Examiner* — Andrew L Swanson
(74) *Attorney, Agent, or Firm* — PROCOPIO, CORY, HARGREAVES & SAVITCH LLP

(57)          ABSTRACT
A multifunctional device for removing a film from a pipe is disclosed. The multifunctional device for removing a film from a pipe, according to the present invention, is a device for removing a film from the inner surface or outer surface of a pipe, and comprises: a tool part for removing the film; a roller part including at least one surface roller traveling on the inner surface or outer surface of the pipe; and a connection part including a first plate connected to the tool part, and a second plate which is arranged on the other side of the first plate so as to be connected to the first plate through one shaft and which is connected to the roller part.

16 Claims, 18 Drawing Sheets

(58) Field of Classification Search

CPC ........ B23K 1/20; F16L 55/18; F16L 2101/12; B24B 9/007

See application file for complete search history.

(56) References Cited

U.S. PATENT DOCUMENTS

| | | | |
|---|---|---|---|
| 7,000,502 B2 * | 2/2006 | Belik ..................... E21B 19/168 | |
| | | | 81/57.2 |
| 9,574,697 B1 * | 2/2017 | Wisehart ................. B23C 3/122 | |
| 2004/0234352 A1 * | 11/2004 | Vanderpol ............... B23Q 9/02 | |
| | | | 409/178 |
| 2005/0034565 A1 * | 2/2005 | Drzewiecki ........... E21B 19/164 | |
| | | | 81/57.17 |
| 2005/0077008 A1 | 4/2005 | Franceschi | |
| 2007/0102488 A1 * | 5/2007 | VanderPol .............. B23C 3/122 | |
| | | | 228/101 |
| 2018/0243832 A1 | 8/2018 | Bruinsma | |
| 2019/0299264 A1 * | 10/2019 | Yoo ......................... B21B 23/00 | |

FOREIGN PATENT DOCUMENTS

| | | | | | |
|---|---|---|---|---|---|
| CN | 105437164 | A | 3/2016 | | |
| CN | 106826706 | A | 6/2017 | | |
| CN | 108746787 | A | 11/2018 | | |
| CN | 109736178 | A | 5/2019 | | |
| CN | 211395282 | U | 9/2020 | | |
| CN | 213296350 | U | 5/2021 | | |
| JP | 06-254718 | A | 9/1994 | | |
| JP | H06-254718 | A | 9/1994 | | |
| JP | 3293932 | B2 * | 6/2002 | | |
| KR | 10-0832836 | B1 | 5/2008 | | |
| KR | 10-1006188 | B1 | 1/2011 | | |
| KR | 10-2013-0133539 | A | 12/2013 | | |
| KR | 10-1381279 | B1 | 4/2014 | | |
| KR | 101389673 | B1 * | 4/2014 | .............. B26D 1/22 |
| KR | 101497638 | B1 | 3/2015 | | |
| KR | 102073015 | B1 * | 2/2020 | ........ B23K 37/0276 |
| WO | 2016/114452 | A1 | 7/2016 | | |

OTHER PUBLICATIONS

Machine Translation Shoichi (JP3293932B2), Generated by Google Patents, 1993 (generated Oct. 30, 2025) (Year: 1993).*

Machine Translation of Woo (KR102073015B1), Generated by Espacenet, 2019 (generated Oct. 29, 2025) (Year: 2019).*

Patent Cooperation Treaty, International Search Report, Application No. PCT/KR2021/017239, dated Apr. 18, 2022, in 4 pages.

European Patent Office, Extended European Search Report, Application No. 21952026.9, dated Oct. 30, 2025, in 14 pages.

* cited by examiner

FIG. 9

MULTIFUNCTIONAL DEVICE FOR REMOVING FILM FROM PIPE

TECHNICAL FIELD

The present disclosure relates to a film removing and, more specifically, to a multifunctional pipe film removing device that removes a film coated or plated on the inner or outer surface of a pipe.

BACKGROUND ART

In the construction and building fields, pipelines may be created by welding pipes with a predetermined length to each other.

In general, pipes are treated with a surface coating on the inner and outer surfaces thereof to prevent corrosion that occurs during storage and transportation after manufacturing, or to prevent corrosion that occurs when using a pipeline. When welding is performed without removing the surface films or oxides generated by corrosion from the pipes, the quality of welded areas may deteriorate and problems such as instability of an arc during welding may occur.

Referring to FIG. 1, the conventional device for removing internal coatings and foreign substances for a pipe disclosed in Korea Patent No. 10-0832836 (registered on May 21, 2008) includes: a machine fixing ring 10 configured to be tightly fixed to the inner surface of the pipe 1; a forward and backward jack 20 operated forward and backward from the machine fixing ring; a motor 30 installed in the center of a fixed body coupled to the forward and backward jack; a rotary shaft 40 coupled to a reducer of the motor; a pre-cutting head 50 coupled to a rotary shaft to finely crush coatings and foreign substances on the inner surface of the pipe; a pre-scratch head 60 coupled to the rotary shaft to scrape off coatings and foreign substances on the inner surface of the pipe; and an air brush 70 configured to spray air in the state of being coupled to the rotary shaft.

However, in the case of removing a film of a pipe is with the conventional device, there were problems in that it is impossible to control the cutting amount of the film and in that it is necessary to use a device having a different size when the diameters of pipes are changed. In addition, there was a disadvantage in that only one of the inner surface film and the outer surface film of the pipe can be removed.

DISCLOSURE OF INVENTION

Technical Problem

The present disclosure was conceived to solve the above problems, and provides a multifunctional film removing device capable of controlling the cutting amount of a film, removing a film regardless of the diameter of a pipe, and removing either the outer surface film or the inner surface film of a pipe depending on desire.

Solution to Problem

The multifunctional pipe film removing device according to the present disclosure removes a film from the inner or outer surface of a pipe. The device may include: a tool section configured to remove the film; a roller section including at least one surface roller running on the inner or outer surface of the pipe; and a connecting section including a first plate to which the tool section is connected, and a second plate disposed on an opposite side of the first plate, connected to the first plate via a single shaft, and connected to the roller section.

In addition, the tool section may include a main body including a rotary motor with a rotary shaft exposed to an outside, and a machining portion, of which an outer peripheral surface is in contact with a surface of the pipe and one side is connected to the rotary shaft.

In this case, the tool section may further include a bearing that is disposed on a remaining side of the machining portion and has an inner diameter connected to the rotary shaft.

More preferably, the machining portion may have an outer diameter larger than the outer diameter of the bearing, and may have a predetermined inclination with respect to the longitudinal direction of the rotary shaft.

In addition, the tool section may have a position that is adjustable in the longitudinal direction of the pipe.

In addition, the roller section may include a main body frame to which the surface roller and the connecting section are connected, and an elastic section that is connected to the main body frame and includes an elastic roller configured to run on the outer surface of the pipe, and a pressing portion configured to press the elastic roller to the outer surface of the pipe.

In this case, the surface roller and the elastic roller may rotate in one direction.

In addition, at least one of the surface roller and the elastic roller may have a rotary shaft inclined at a predetermined angle with respect to an extension direction of the pipe to bring the main body frame into close contact with a cross section of the pipe during rotating and advancing.

In addition, the roller section may further include a guide roller connected to the main body frame, provided on at least one of front and rear sides of the surface roller in an advancing direction, and configured to run on an end surface of the pipe in the extension direction.

In addition, the first plate may further include an insertion hole which penetrates the first plate from one surface to the other surface and into which the tool section is inserted, and a cut through-space configured to be pressed by adjusting a diameter of the insertion hole, and the connecting section may further include a diameter adjusting bolt which passes through the through-space from the outside of a side surface of the first plate to be fastened to the first plate.

In addition, the first plate may further include a first fastening hole which penetrates the first plate from one surface of the other surface, the second plate may further include a second fastening hole which communicates with the first fastening hole on an outside of a side surface of the second plate and penetrates the second plate toward the inner or outer surface of the pipe where the tool section is in contact, and the connecting section may include a first fastening member inserted into the first fastening hole, and a second fastening member inserted into the second fastening hole and having an end in contact with the other end of the first fastening member.

In this case, the second housing may include a first spring inserted into the second fastening hole, and an adjusting bolt mounted on the outside of the side surface of the second plate to adjust the elastic force of the first spring.

In addition, the first plate may further include a third fastening hole which penetrates the first plate from one surface of the other surface. The second plate may further include a bushing recess penetrating the second plate from one surface to the other surface and communicating with the third fastening hole, and the connecting section may further include a third fastening member fastened to the third fastening hole. The bushing recess may have a predetermined area on one side where the diameter of the bushing recess increases toward one end of the bushing recess. The third fastening member may have a predetermined area on a remaining side where a diameter of the third fastening member decreases toward a remaining end of the third fastening member, and further include a second spring installed on the first plate and wound around an outer peripheral surface on one side of the third fastening member.

In addition, the second plate may include a pipe diameter adjusting line formed by an area of a predetermined angle which penetrates the second plate from one surface to the other surface, the connecting section may further include a pipe diameter adjusting/fastening member fastened to the pipe diameter adjusting line and the roller section, and the second plate may include a stroke limiting ridge protruding on one surface of the second plate. The first plate may further include a stroke limiting recess provided on the remaining surface of the first plate to accommodate one side of the stroke limiting ridge, and the stroke limiting recess has a position that is relatively variable with respect to the stroke limiting ridge.

In addition, the surface roller and the elastic roller may be arranged to face each other in a state in which each of the surface roller and the elastic roller is in contact with the outer surface of the pipe.

In addition, the position where the surface roller is coupled on the roller section may be changed.

Advantageous Effects of Invention

With the multifunctional pipe film removing device according to the present disclosure described above, film removal is possible regardless of a pipe diameter, the structure of the device is simple, making it easy to use and manufacture, and a film on either the outer surface or the inner surface of a pipe can be removed by adjusting the relative position or angle of the tool section and the roller section via the configuration of the connecting section.

BRIEF DESCRIPTION OF DRAWINGS

FIG. 9 is a front view of a first plate of the multifunctional pipe film removing device according to the present disclosure;

DESCRIPTION OF REFERENCE NUMERALS OF DRAWINGS

Figure 1:
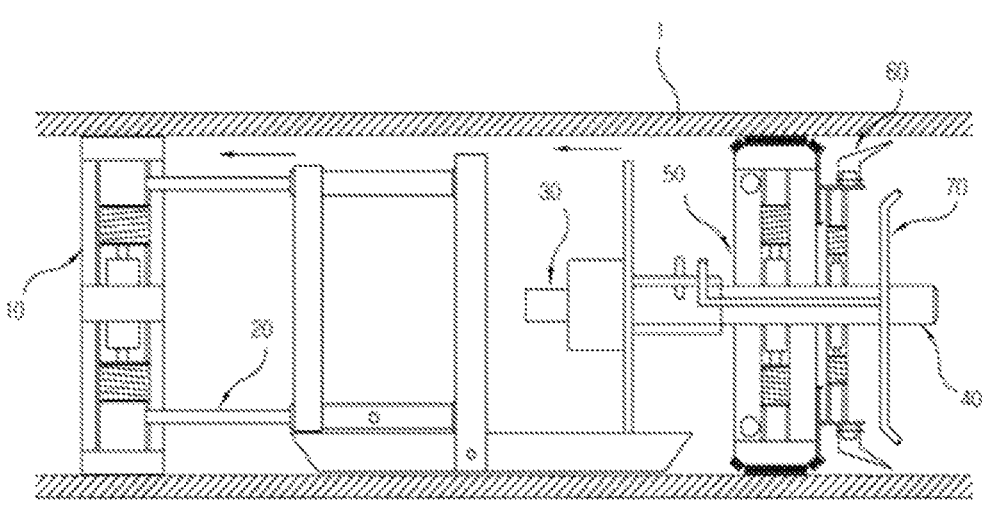
FIG. 1 is a cross-sectional view of a conventional internal coating and foreign substance removing device for a pipe.

1000: multifunctional pipe film removing device, 100: tool section, 110: main body, 111: rotary shaft, 120: machining portion, 130: bearing, 200: roller section, 210: surface roller, 211: roller mounting hole, 220: main body frame, 230: elastic section, 231: elastic roller, 232: pressing portion, 240: guide roller, 300; connecting section, 301: connecting shaft, 310: first plate, 311: insertion hole, 312: through-space, 313: first fastening hole, 314: third fastening hole, 315: stroke limiting recess, 316: shaft connecting hole, 320: second plate, 321: second fastening hole, 322: bushing recess, 323: pipe diameter adjusting line, 324: stroke limiting ridge, 325: shaft connecting hole, 400: diameter adjusting bolt, 410: first fastening member, 420: second fastening member, 421: adjusting bolt, 422: first spring, 430: third fastening member, 431: second spring, 440: pipe diameter adjusting/fastening member, P: pipe

BEST MODE FOR CARRYING OUT THE INVENTION

Hereinafter, the technical idea of the present disclosure will be described in more detail with reference to the accompanying drawings. Prior to this, the terms and words used in the specification and claims should not be construed as limited to their ordinary or dictionary meanings, but should be construed as meanings and concepts consistent with the technical idea of the present disclosure based on a principle that the inventor may appropriately define the concepts of terms in order to explain his or her invention in the best way.

Accordingly, it should be understood that since the embodiments described in this specification and the configurations illustrated in the drawings are merely exemplary embodiments of the present disclosure, and do not represent all the technical ideas of the present disclosure, there may be various modifications that may replace the embodiments at the time of filing the present application.

Hereinafter, the technical idea of the present disclosure will be described in more detail with reference to the accompanying drawings. The accompanying drawings merely illustrate examples to describe the technical idea of the present disclosure in more detail, and thus the technical idea of the present disclosure is not limited to the types of the accompanying drawings.

Figure 2:
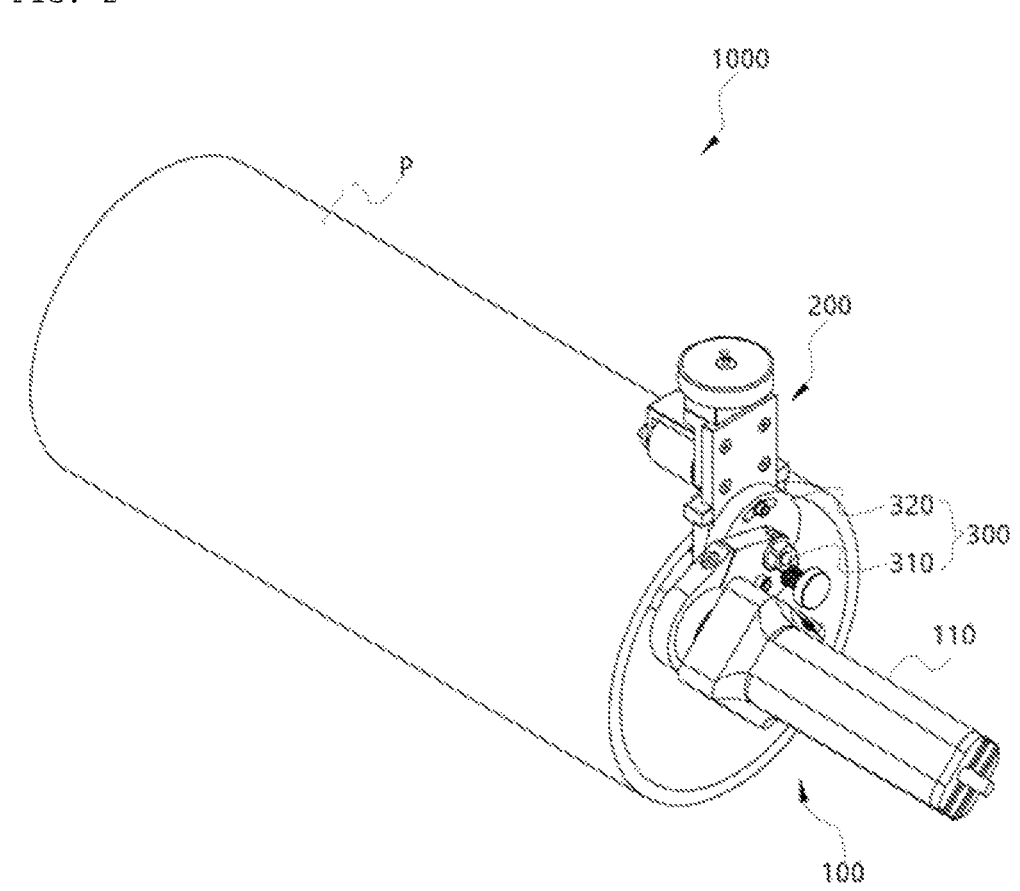
FIG. 2 is a perspective view of a multifunctional pipe film removing device according to the present disclosure.

Referring to FIG. 2, a multifunctional pipe film removing device 1000 according to the present disclosure is an device for removing a film on the inner or outer surface of a pipe P. The device may include: a tool section 100 configured to remove the film; a roller section 200 including at least one surface roller 210 running on the inner or outer surface of the pipe P, and a connecting section 300 including a first plate 310 connected to the tool section 100 and a second plate 320 disposed on the opposite side of the first plate 310, wherein the second plate 320 is connected to the first plate 310 via a single shaft and the roller section 200 is connected to the second plate 320.

The roller section 200 runs along the inner or outer surface of the pipe P, and the tool section 100 is disposed in the front or rear of the roller section 200 in the running direction to cut a film on the inner or outer surface of the pipe P following the roller section 200.

The connecting section 300 interconnects the roller section 200 and the tool section 100 such that the roller section 200 is in close contact with the inner or outer surface of the pipe P, and the tool section 100 is brought into close contact with the inner or outer surface of the pipe P following the running of the roller section 200 to remove the film.

The multifunctional pipe film removing device 1000 according to the present disclosure as described above is capable of removing a film regardless of the diameter of a pipe P, has a simple structure to be easy to use and manufacture, making it easy to use and manufacture, and is capable of adjusting the relative position or angle of the tool section 100 and the roller section 200 to remove the film either on the outer surface or the inner surface of the pipe P with the configuration of the connecting section 300.

Figure 3:
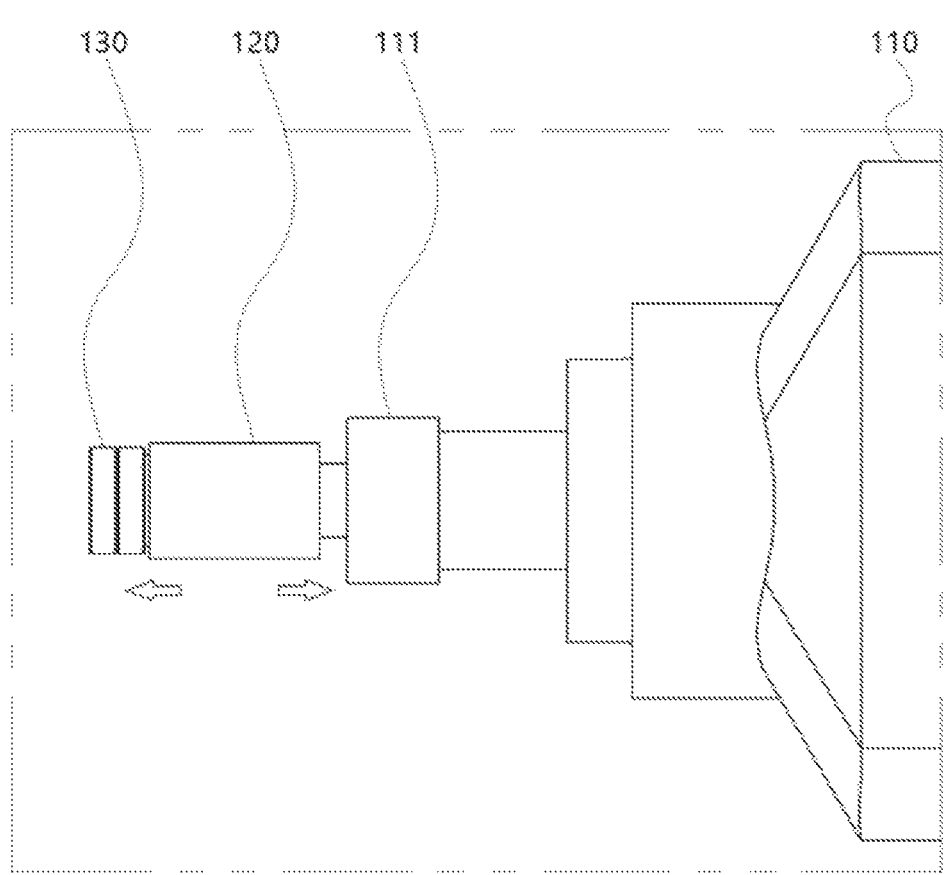
FIG. 3 is an enlarged side view of a tool section of the multifunctional pipe film removing device according to the present disclosure.

Referring to FIG. 3, the tool section 100 may include a main body 110 including a rotary motor having a rotary shaft 111 exposed to the outside, a machining portion 120 having an outer peripheral surface in contact with the surface of the pipe P and being connected to the rotary shaft 111 at one side thereof.

The rotary shaft 111 is rotated by the rotary motor, the machining portion 120 rotates following the rotation of the rotation shaft 111, and the outer peripheral surface of the machining portion 120 comes into contact with the inner surface or the inner surface of the pipe P to remove the film.

In this case, the tool section 100 may further include a bearing 130 disposed on the other side of the machining portion 120 and having an inner diameter connected to the rotary shaft 111.

The bearing 130 is coupled to the tool section 100 and rotates with the rotary shaft 111, and the outer diameter of the bearing runs on the inner or outer surface of the pipe P like the surface roller 210. The bearing 130 may support the machining portion 120 on the inner or outer surface of the pipe P, and the other end of the machining portion 120 may be in contact with the inner or outer surface of the pipe P to maintain a predetermined machining amount of the pipe P.

More preferably, the outer diameter of the machining portion 120 may be larger than the outer diameter of the bearing 130, and may have a certain inclination with respect to the longitudinal direction of the rotary shaft 111. Accordingly, the maximum depth at which the surface of the pipe P is cut may be determined by the difference in the outer diameters of the machining portion 120 and the bearing 130, and the shape of the cutting surface may not be parallel to the rotary shaft 111, but may be inclined depending on the certain inclination of the outer diameter of the machining portion 120.

In addition, the position of the tool section 100 may be adjustable in the longitudinal direction of the pipe P. That is, the position of the tool section 100 or the machining portion 120 itself may be adjustable in the longitudinal direction of the pipe P so that the machining width of the film to be removed from the pipe P can be adjusted.

In addition, the main body 110 of the tool section 100 is connected to the first plate 310 by being at least partially inserted into an insertion hole 311. At this time, the position of the tool section 100 may be adjusted by tightening or loosening a diameter adjusting bolt 400 and moving the main body 110 along the longitudinal direction of the pipe P.

Figure 4:
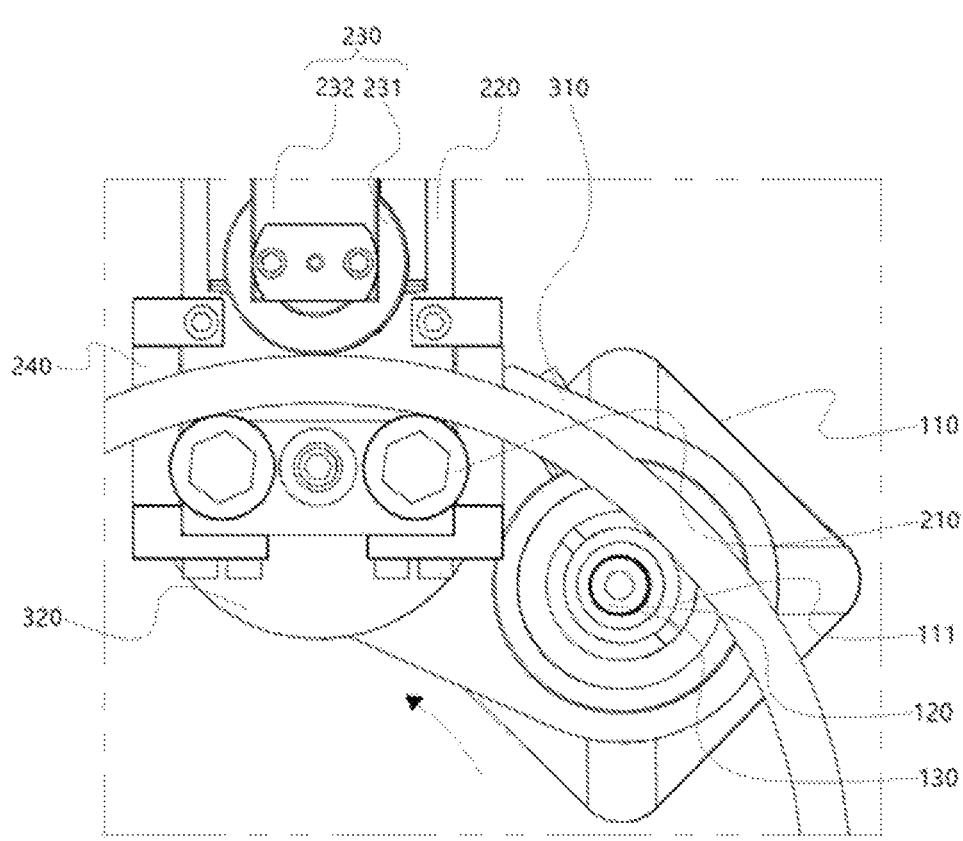
FIG. 4 is an enlarged front view of the multifunctional pipe film removing device according to the present disclosure.

Referring to FIG. 4, the roller section 200 may include a main body frame 220, to which the surface roller 210 and the connecting section 300 are connected, an elastic roller 231 connected to the main body frame 220 and configured to run on the outer surface of the pipe P, and an elastic section 230 including a pressing portion 232 configured to press the elastic roller 231 against the outer surface of the pipe P.

One surface of the main body frame 220 may be connected to the connecting section 300, and the pressing portion 232 may be connected to the other surface. The elastic roller 231 may be pressed by the pressing portion 232 to press the outer or inner surface of the pipe P and may run in close contact with the outer or inner surface of the pipe P.

When the surface roller 210 runs on the inner surface of the pipe P, the elastic roller 231 disposed to face the surface roller 210 runs in close contact with the outer surface of the pipe P so that the elastic roller can actively run in response to the deformation of the pipe P.

In this case, the elastic roller 231 may be fabricated to have a metal collar with a larger diameter than the surface roller 210 and configured to be elastically supported by the pressing portion 232. Two or more surface rollers 210 may be provided, in which case, the elastic roller 231, which has a larger diameter than the surface rollers 210, may be located between the two surface rollers 210.

In addition, the surface rollers 210 and the elastic roller 231 may be rotatable in one direction. That is, the surface rollers 210 and the elastic roller 231 may be configured to include a device that fixes the rotation direction in one direction, thereby preventing reverse rotation from occurring during film removal.

Figure 5A:
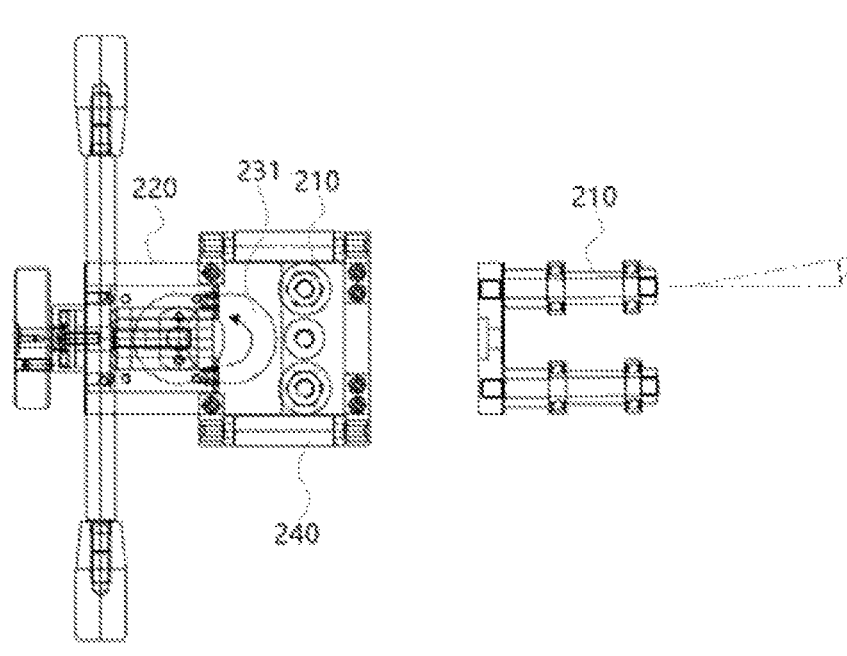
FIGS. 5A and 5B are views illustrating first and second embodiments of the multifunctional pipe film removing device according to the present disclosure in which the angles of the rotary shafts of surface rollers are changed depending on a rotation direction.
Figure 5B:
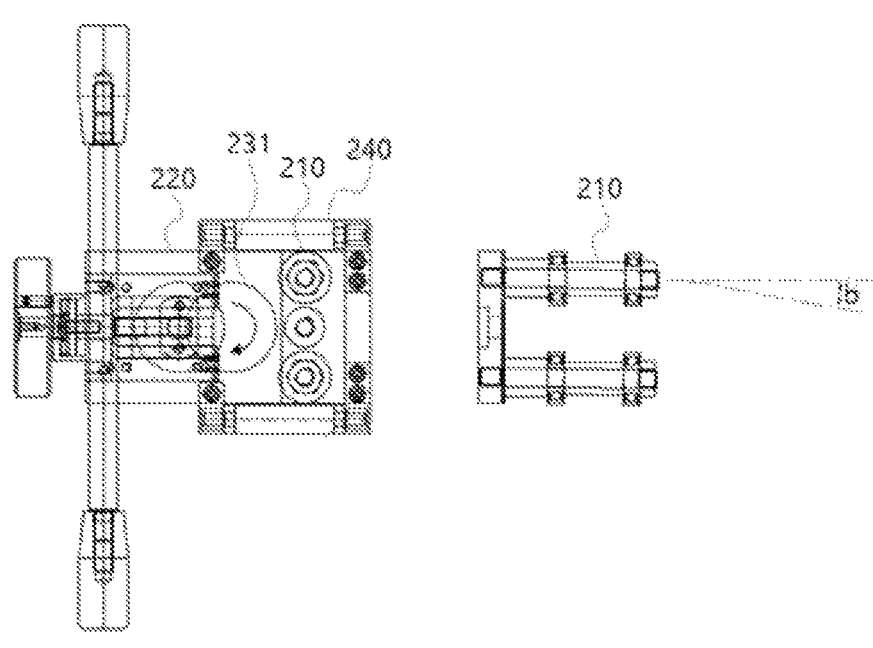

Referring to FIGS. 5A and 5B, the surface rollers 210 may have rotary shafts inclined at a predetermined angle with respect to the extension direction of the pipe P to bring the main body frame 220 into close contact with the cross section of the pipe P during rotating and advancing.

That is, the surface rollers 210 may have rotary shafts configured to be inclined at a predetermined angle with respect to the extension direction of the pipe P such that the main body frame 220 can be brought into close contact with the pipe P when the surface rollers rotate.

Figure 6A:
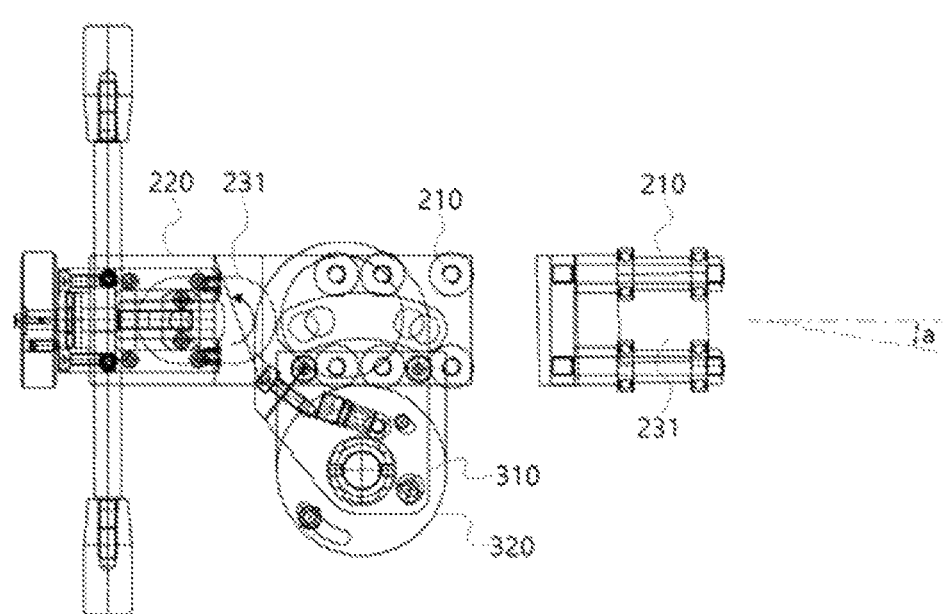
FIGS. 6A and 6B are views illustrating first and second embodiments of the multifunctional pipe film removing device according to the present disclosure in which the angles of the rotary shaft of elastic roller is changed depending on a rotation direction.
Figure 6B:
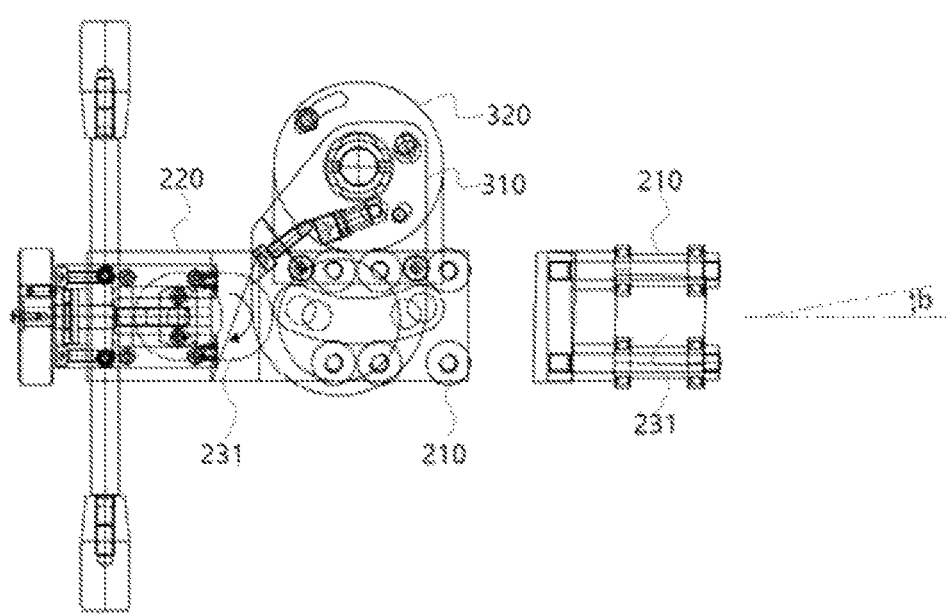

Referring to FIGS. 6A and 6B, the elastic roller 231 may have a rotary shaft inclined at a predetermined angle with respect to the extension direction of the pipe P to bring the main body frame 220 into close contact with the cross section of the pipe P during rotating and advancing. That is, the elastic roller 231 may have a rotary shaft configured to be inclined at a predetermined angle with respect to the extension direction of the pipe P such that the main body frame 220 can be brought into close contact with the pipe P when the elastic roller rotates.

Referring to 4 to 6B, the roller section 200 may further include a guide roller 240 connected to the main body frame 220, provided in at least one of the front and rear of the surface rollers 210 in the advancing direction, and configured to run on the surface of the end of the pipe P in the extension direction.

When the surface rollers 210 or the elastic roller 231 run, the guide roller 240 reduces friction that occurs between the cross section of the pipe P and the main body frame 220 so that the main body frame 220 can run smoothly in the state of being in close contact with the end of the pipe P.

Figure 7:
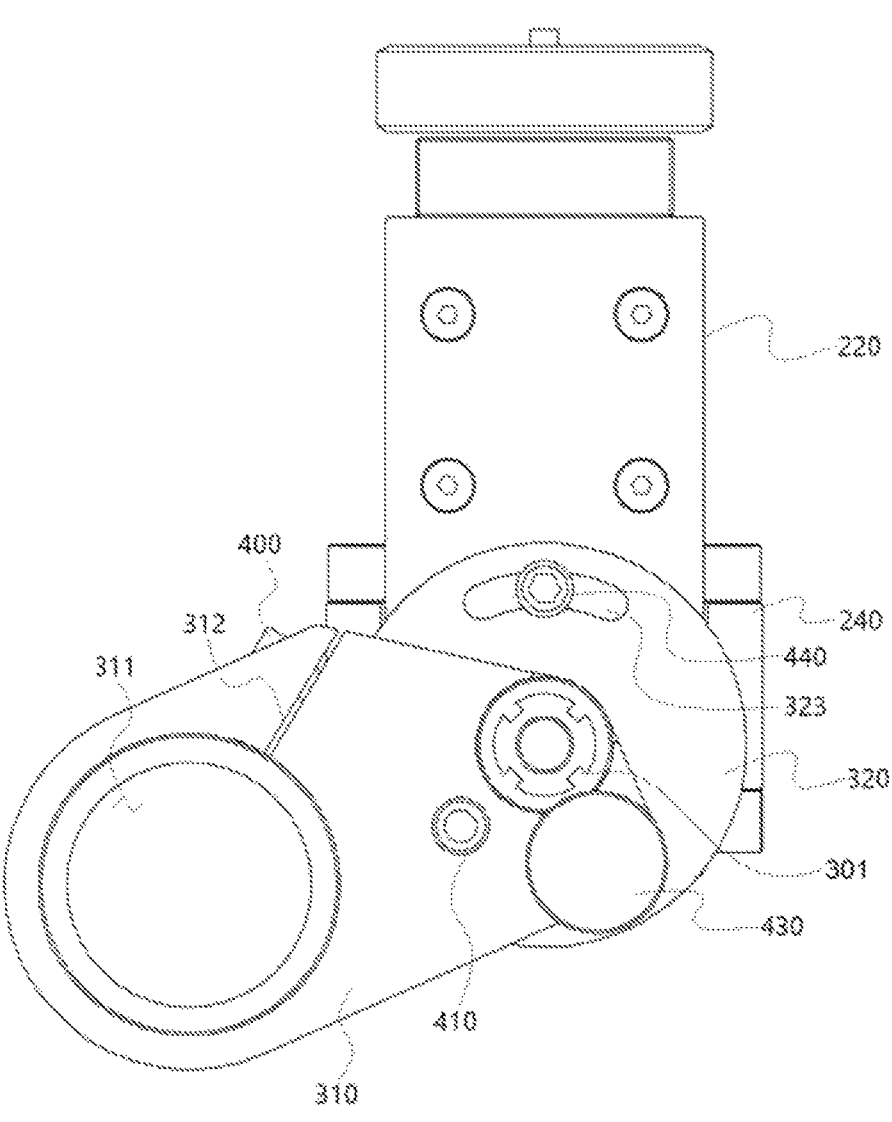
FIG. 7 is a rear view of the multifunctional pipe film removing device according to the present disclosure.

In addition, referring to FIGS. 7, the second plate 320 may include a pipe diameter adjusting line 323 formed by penetrating a predetermined angle area from one surface to the other surface. In addition, the connecting section 300 may further include a pipe diameter adjusting/fastening member 440 that is in sequence or simultaneously fastened to the pipe diameter adjusting line 323 and the roller section 200.

The pipe diameter adjusting line 323 is configured to adjust and fix the positions of the roller section 200 and the tool section 100. More specifically, the pipe diameter adjusting line may maintain the state in which the machining portion 120 and the surface rollers are in close contact with the surface of the pipe P by adjusting the positions of the machining portion 120 and the surface rollers 210 depending on the diameter of the pipe P.

Figure 8:
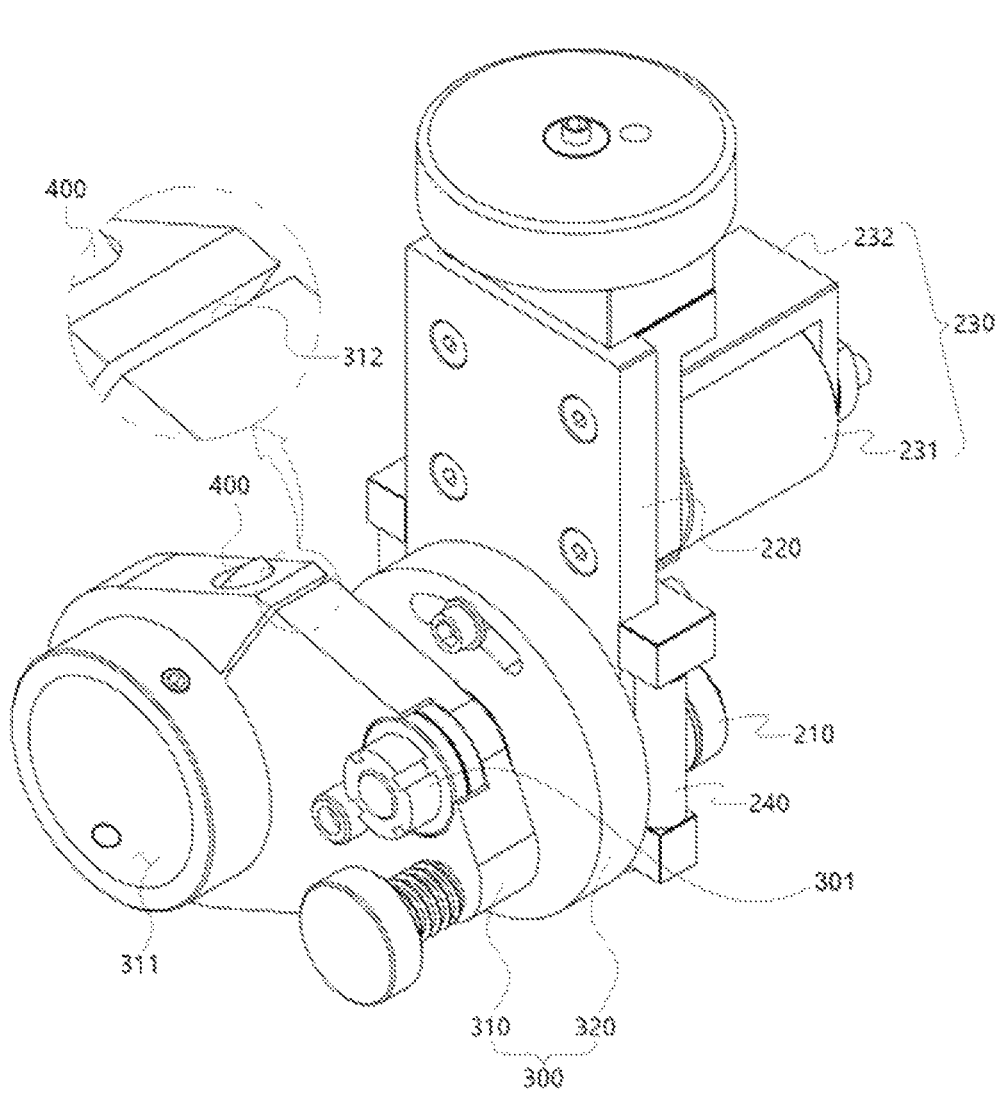
FIG. 8 is a rear perspective view of the first embodiment of the multifunctional pipe film removing device according to the present disclosure.

Referring to FIGS. 7 and 8, the first plate 310 and the second plate 320 have a predetermined thickness. One surface of the first plate 310 is exposed to the outside, and the other surface of the first plate 310 and one surface of the second plate 320 may overlap to form the connecting section 300.

Referring to FIGS. 8 to 11, the first plate 310 and the second plate 320 are relatively rotated with respect to a plate connecting shaft 301 which interconnects the first and second plates while penetrating shaft connecting holes 316 and 325, which are formed in the first and second plates, respectively.

Figure 9:
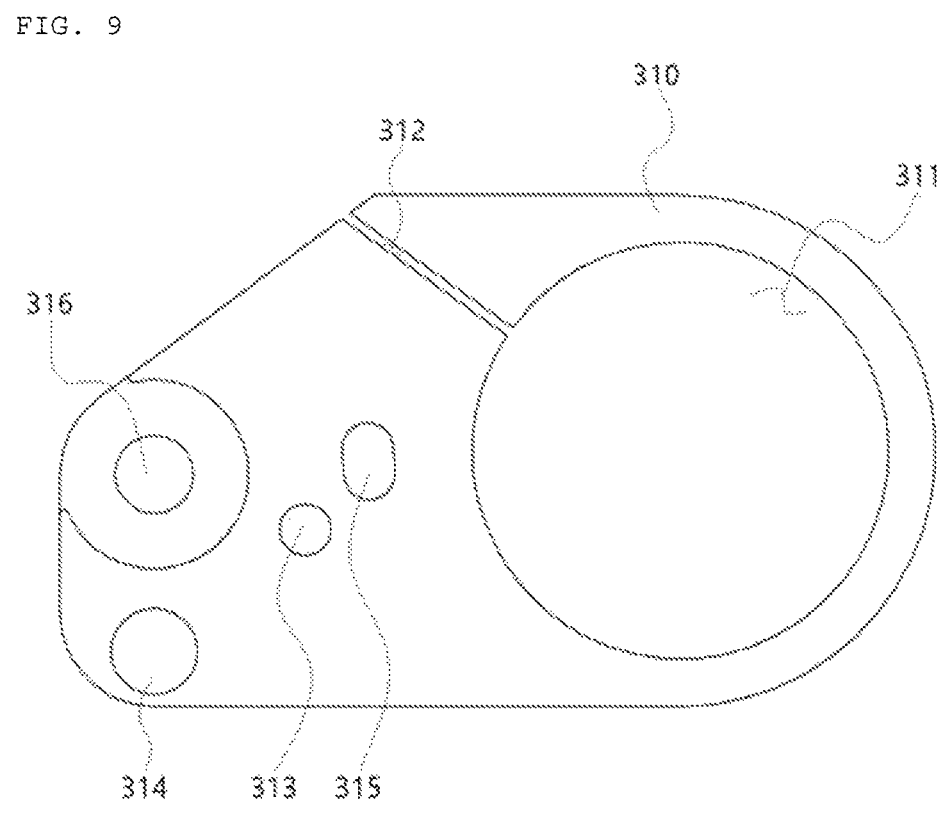

Referring to FIGS. 8 and 9, the first plate 310 may include an insertion hole 311 which penetrates the first plate from one surface to the other surface and into which the tool section 100 is inserted, and a cut through-space 312 configured to adjust and press the diameter of the insertion hole 311. In addition, the connecting section 300 may further include a diameter adjusting bolt 400 that penetrates across the through-space 312 from the outside of a side surface of the first plate 310 and is fastened to the inside of the first plate 310.

The tool section 100 may be adjustable in the longitudinal direction of the pipe P through the through-space 312, and the tool sections 100, which may have various diameters, can be mounted in the insertion hole 311. When the diameter adjusting bolt 400 is fastened to the first plate 310 in the state in which the tool section 100 is inserted into the insertion hole 311, the position of the tool section 100 may be fixed on the first plate 310 to be unchangeable.

Figure 10:
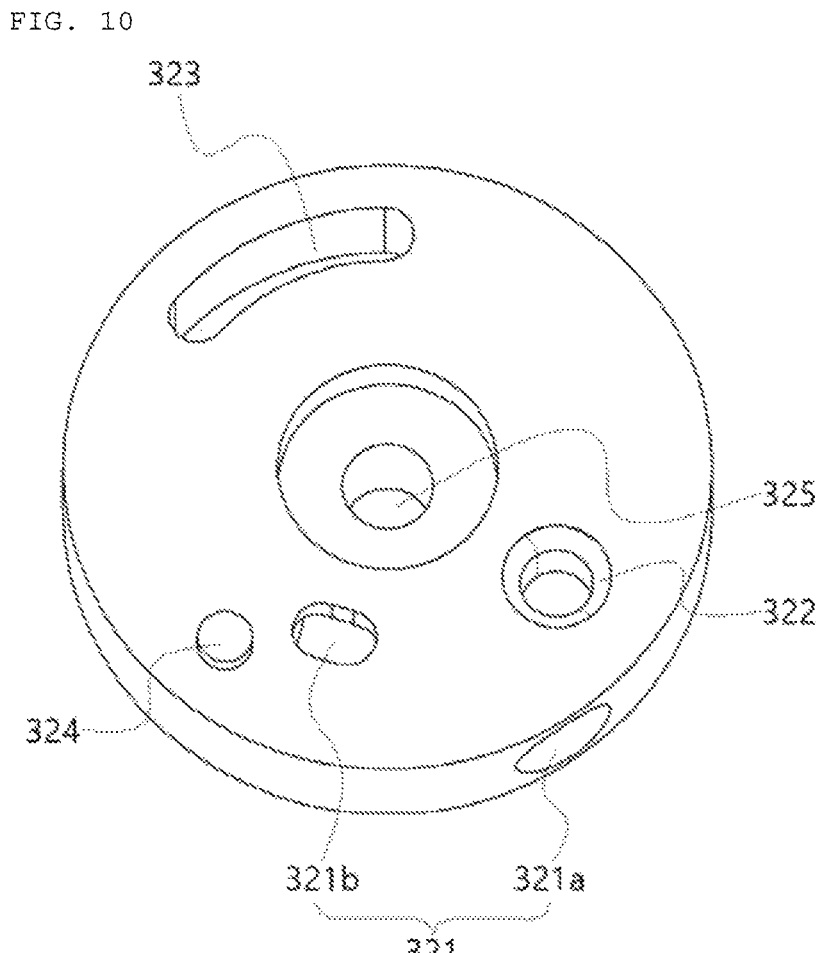
FIG. 10 is a perspective view of a second plate of the multifunctional pipe film removing device according to the present disclosure.
Figure 11:
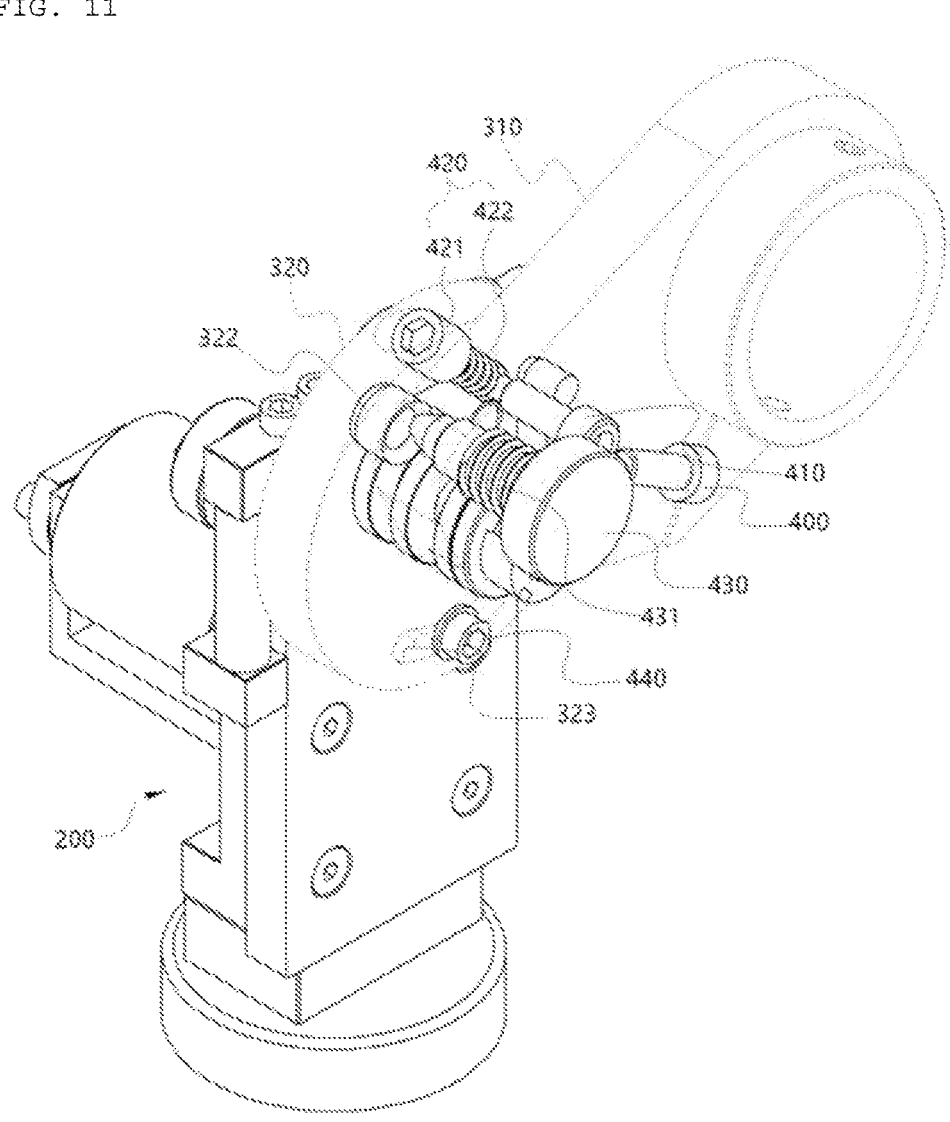
FIG. 11 is a perspective view illustrating the interior of the rear connecting section of the first embodiment of the multifunctional pipe film removing device according to the present disclosure.

Referring to FIGS. 9 to 11, the first plate 310 may further include a first fastening hole 313 penetrating the first plate 310 from one surface to the other surface, and the second plate 320 may include a second fastening hole 321 communicating with the first fastening hole 313 on the outside of the side surface of the second plate 320. In addition, the connecting section 300 may include a first fastening member 410 inserted into the first fastening hole 313, and a first spring 422 inserted into the second fastening hole 321 such that an end thereof abuts the other end of the first fastening member 410.

In this case, the second fastening member 420 may include the first spring 422 inserted into the second fastening hole 321 and an adjusting bolt 421 mounted outside the side surface of the second plate 320 to adjust the elastic force of the first spring 422. The first spring 422 is preferably configured as a compression spring.

When the first fastening member 410 is fastened from one surface to the other surface of the first plate 310, the other end of the first fastening member 410 is in contact with the end of the first spring 422. In this case, when the first spring 422 presses the first fastening member 410, the machining portion 120 mounted on the first plate 310 is elastically supported toward the inner or outer surface of the pipe P to be pressed against the inner or outer surface of the pipe P.

The amount of cutting of the film is determined by the difference in outer diameter between the machining portion 120 and the bearing 130 installed at the end of the machining portion 120. In this case, by the adjusted elastic force of the first spring 422 pressing the first fastening member 410, the machining portion 120 can maintain a constant cutting amount despite the deformation of the pipe P (deviation from the perfect circle shape) or a change in thickness (outer diameter and inner diameter) of the pipe P.

When the support direction of the first spring 422 for the first fastening member 410 is changed from the inner diameter to the outer diameter or from the outer diameter to the inner diameter as necessary, the device of the present disclosure may be converted into an device for machining the outer diameter or an device for machining the inner diameter.

The adjusting bolt 421 is fastened to the second plate 320, and the elastic force of the first spring 422 can be adjusted depending on the fastening depth of the second plate 320. As the fastening depth of the adjusting bolt 421 increases, the elastic force of the compressed first spring 422 increases, so that the adhesion between the pipe P and the tool section 100 (or the machining portion 120) increases.

Figure 12:
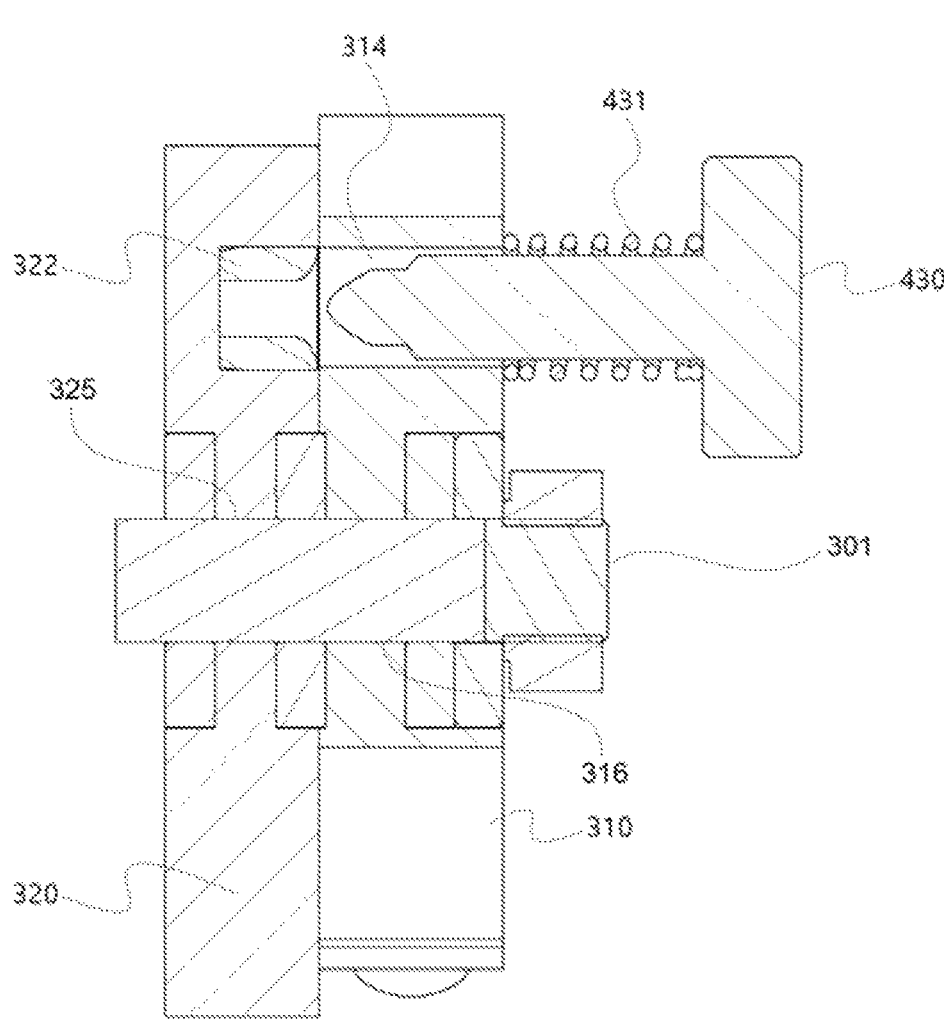
FIG. 12 is a cross-sectional view of the second embodiment of the multifunctional pipe film removing device according to the present disclosure.

Referring to FIG. 12, the first plate 310 may further include a third fastening hole 314 penetrating the first plate 310 from one surface to the other surface. In addition, the second plate 320 may further include a bushing recess 322 that penetrates the second plate 320 from one surface to the other surface and communicates with the third fastening hole 314. In addition, the connecting section 300 may further include a third fastening member 430 fastened to the third fastening hole 314.

The third fastening member 430 may remain screwed into the third fastening hole 314, and may or may not be partially inserted into the bushing recess 322 depending on the screw fastening depth.

In this case, the diameter of the bushing recess 322 may become larger toward one end in a predetermined area at one side, and the diameter of the third fastening member 430 may become smaller toward the other end in a predetermined area at the other side. In addition, the third fastening member 430 may further include a second spring 431 that is fixed to the first plate 310 and wound around the outer peripheral surface of the third fastening member 430 at one side.

The second spring 431 is configured to elastically support the third fastening member 430 such that the third fastening member 430 is not released and its position does not change due to factors such as vibration during operation.

Figure 13:
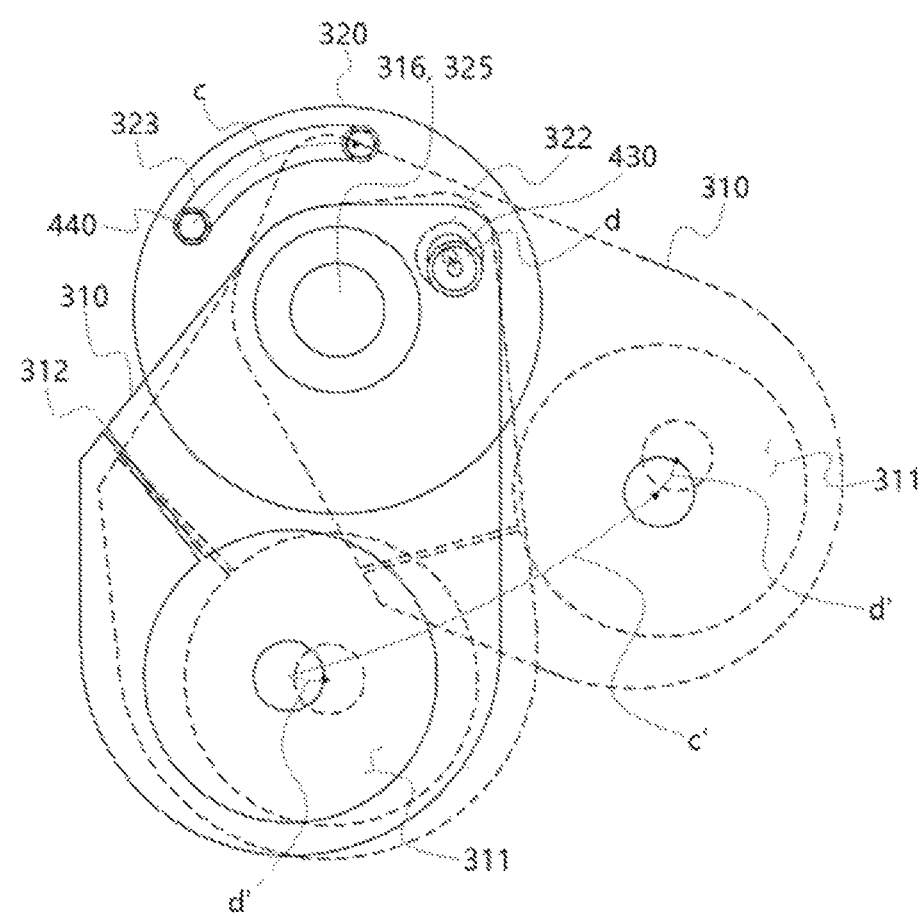
FIG. 13 is a schematic view illustrating the rotation of the multifunctional pipe film removing device according to the present disclosure.
Figure 14:
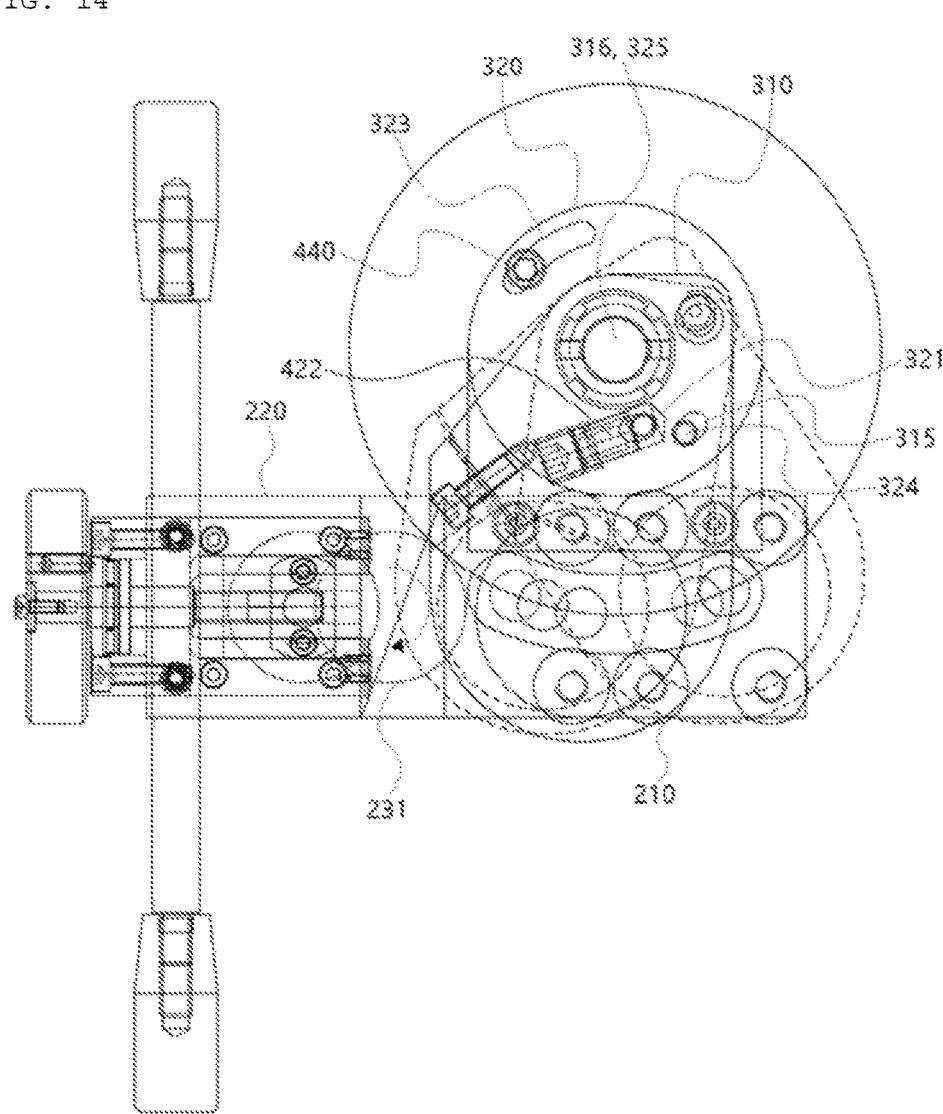
FIG. 14 is a front view of the multifunctional pipe film removing device according to the present disclosure when machining the inner diameter of a pipe.
Figure 15:
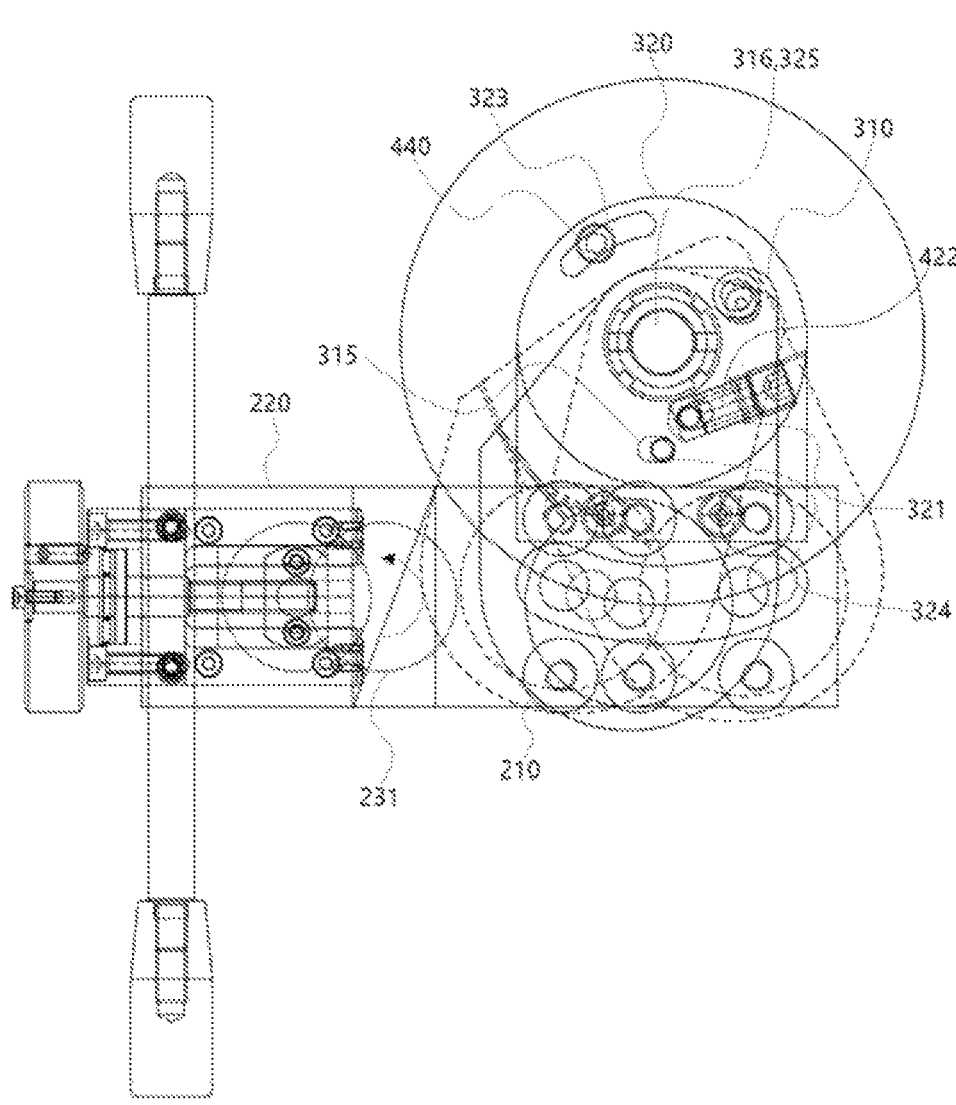
FIG. 15 is a front view of the multifunctional pipe film removing device according to the present disclosure when machining the outer diameter of a pipe.

Referring to FIGS. 13 to 15, a displacement c, which is generated by the coupling of the pipe diameter adjusting/fastening member 440 and the roller section 200 and the pipe diameter adjusting line 323, is provided to cope with a change in the diameter of the pipe P. In addition, the third fastening member 430 and the third fastening hole 314 may adjust the positional change of the machining portion 120. In addition, a displacement d, which is generated depending on the degree of coupling between the third fastening member 430 and the bushing recess 322, is provided to adjust the cutting displacement of the tool section 100.

When the surface roller 210 and the elastic roller 231 are fixed to one surface of the pipe P and the pipe diameter adjusting line 323 is adjusted to match the standard (diameter) of the pipe P, the displacement c can be adjusted. In addition, when the third fastening member 430 is gradually inserted into or extracted from the bushing recess 322 while rotating the machining portion 120, the machining portion 120 moves by the displacement d with respect to the connecting shaft 301. At this time, the first fastening member 410 presses the first spring 422, which serves to press the tool section 120 against the inner or outer surface of the pipe P.

Referring to FIGS. 14 and 15, the positions of the second fastening hole 321 and a stroke limiting recess 315 and the direction of pressing the first spring 422 may be set to be different from each other. That is, when removing the inner diameter film of the pipe P, the above-described components may be arranged such that the machining portion 120 presses the inner diameter of the pipe P. In contrast, when removing the outer diameter film of the pipe P, the above-described components may be arranged such that the machining portion 120 presses the outer diameter of the pipe P.

Figure 16:
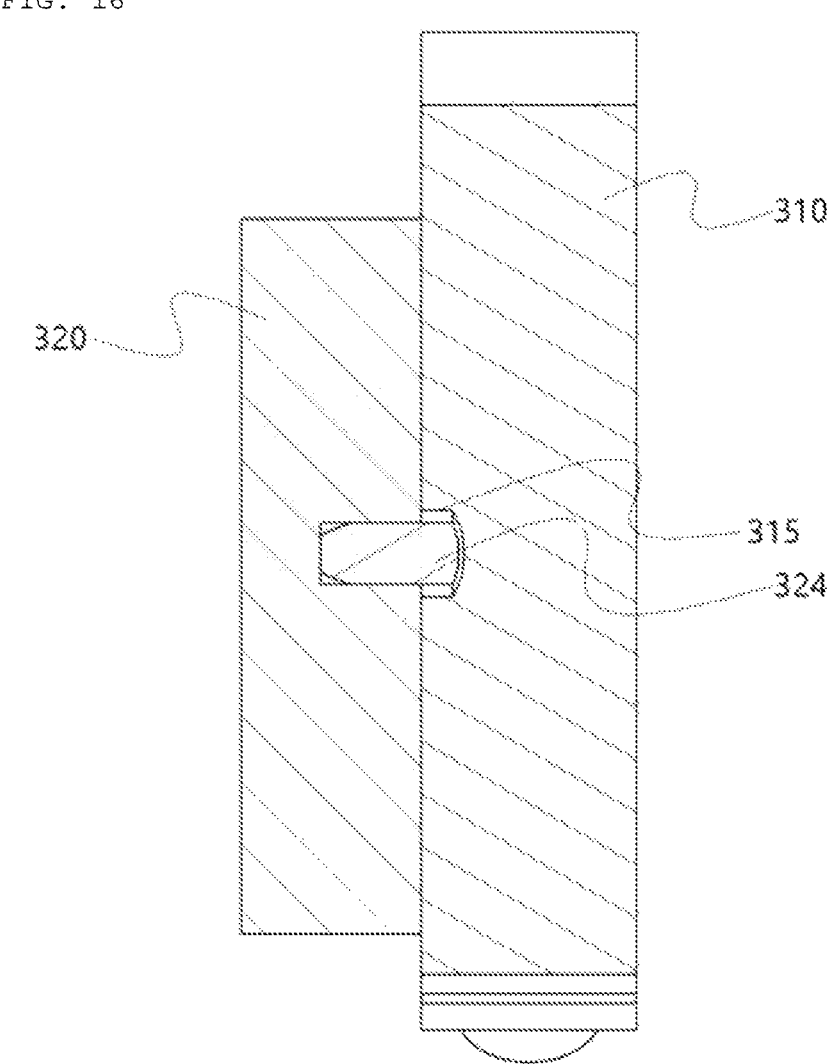
FIG. 16 is a cross-sectional view of a third embodiment of the multifunctional pipe film removing device according to the present disclosure.

Referring to FIG. 16, the second plate 320 may further include a stroke limiting ridge 324 that protrudes on one surface thereof, the first plate 310 may further include the stroke limiting recess 315 on the other surface thereof to accommodate one side of the stroke limiting ridge 324, and the position of the stroke limiting recess 315 may be relatively variable with respect to the stroke limiting ridge 324.

The stroke limiting recess 315 and the stroke limiting ridge 324 are configured to position the third fastening member 430 such that the third fastening member 430 does not deviate from the insertion position within a predetermined area even when the third fastening member 430 is completely removed from the third fastening hole 314.

Figure 17:
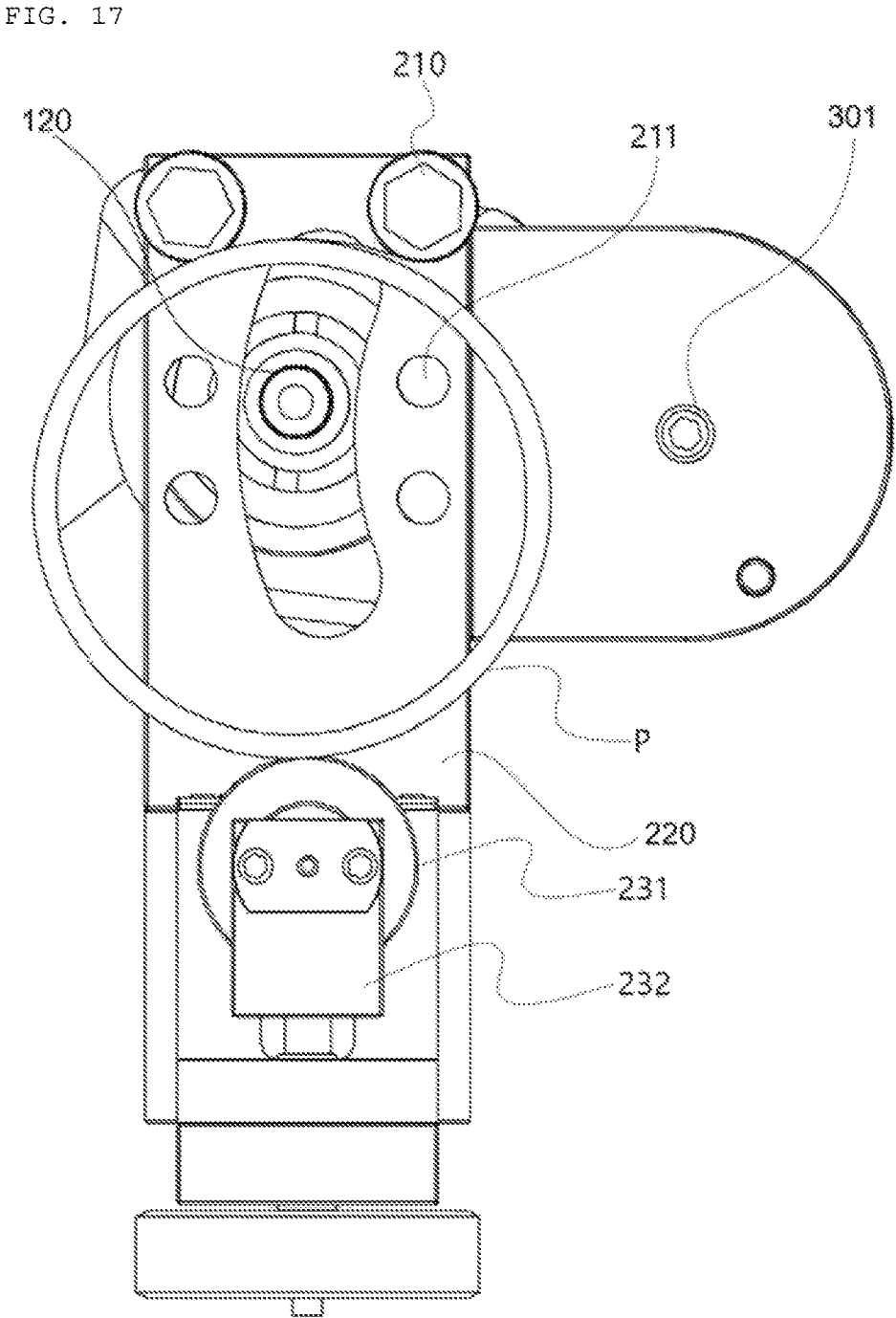
FIG. 17 is a front view of a fourth embodiment of the multifunctional pipe film removing device according to the present disclosure.

Referring to FIG. 17, the surface rollers 210 and the elastic roller 231 may be arranged to face each other in the state in which each of the surface rollers and the elastic roller are in contact with the outer surface of the pipe P.

That is, when the diameter of the pipe P is small, film cutting can be performed more stably when the surface rollers 210 rotate on the outer surface of the pipe P rather than rotating on the inner surface of the pipe P. In this case, the surface rollers 210 and the elastic roller 231 are arranged to run while pressing the pipe P in opposite directions with respect to the pipe P, so that the roller section 200 can be seated more stably on the pipe P.

As illustrated in FIG. 17, in order to ensure that the first plate 310 and the second plate 320 can relatively rotate depending on the standard of the pipe P, the first plate 310 and the second plate 320 may be coupled to a bracket separately configured on the main body frame 220 via the connecting shaft 301.

Figure 18:
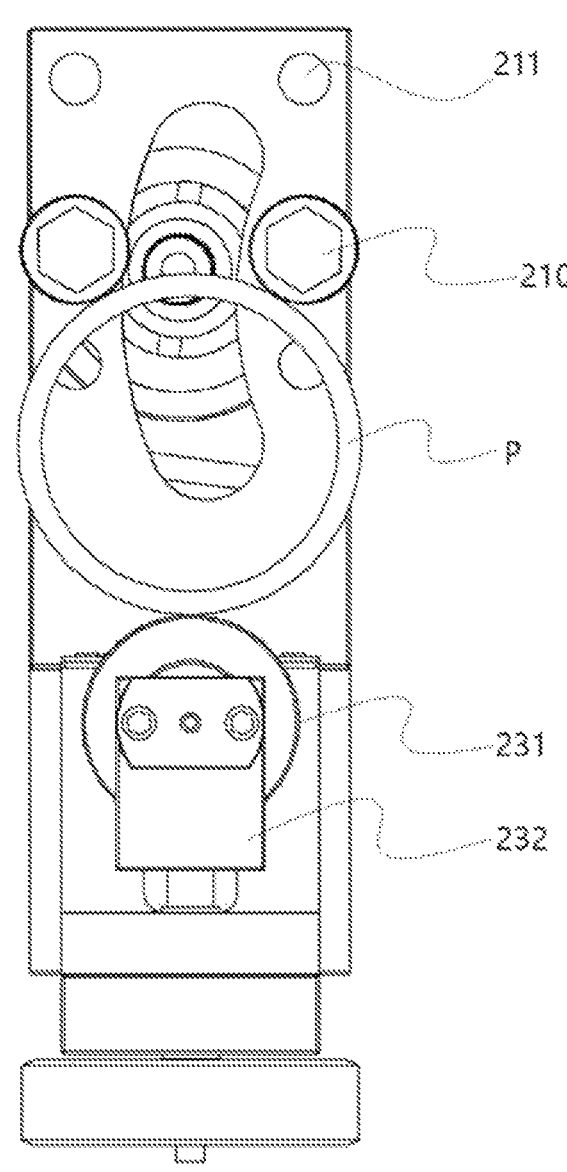
FIG. 18 is a front view of a fifth embodiment of the multifunctional pipe film removing device according to the present disclosure.

Referring to FIGS. 17 and 18, the positions where the surface rollers 210 are coupled on the roller section 200 may be changed. That is, in order to remove a film of a relatively smaller pipe P, the pipe P can be seated between the elastic roller 231 and the surface rollers 210 by changing the coupled positions of the surface rollers 210. The surface rollers 210 may be coupled to a plurality of roller mounting holes 211 spaced apart from each other along the extension direction of the main body frame 220, and the coupling positions may change depending on the diameter of the pipe P.

Although not illustrated, the multifunctional pipe film removing device 1000 according to the present disclosure can remove the film on the outer or inner surface of the pipe P by changing the position or angle of the tool section 100 via the connecting section 300 such that the machining portion 120 is disposed to be in contact with the outer or inner surface of the pipe P.

In addition, the shape of the machining portion 120 itself may be manufactured to be inclined, or the machining portion 120 may be disposed to be inclined at a predetermined angle rather than horizontally with respect to the surface of the pipe P to be capable of machining the surface of the pipe P to be inclined.

The present disclosure can be applied in various ways over a wide range without being limited to the above-described embodiments, and various modifications can be made without departing from the gist of the present disclosure defined in the claims.

INDUSTRIAL APPLICABILITY

In view of the fact that, according to the multifunctional pipe film removing device according to the present disclosure, film removal is possible regardless of a pipe diameter, the structure of the device is simple, making it easy to use and manufacture, and a film on either the outer surface or the inner surface of a pipe can be easily removed by adjusting the relative position or angle of the tool section and the roller section via the configuration of the connecting section, the present disclosure overcomes the limits of existing technologies. As a result, the present disclosure has sufficient potential for commercialization or sales of devices that use the related technology and are applied to the related technology and is capable of being clearly implemented in reality so that the present disclosure can be industrially used.

The invention claimed is:

1. A multifunctional pipe film removing device configured to remove a film from an inner or outer surface of a pipe, the device comprising:
   a tool section configured to remove the film;
   a roller section comprising at least one surface roller running on the inner or outer surface of the pipe; and
   a connecting section comprising a first plate to which the tool section is connected, and a second plate disposed on an opposite side of the first plate, wherein the second plate is connected to the first plate via a single shaft and the roller section is connected to the second plate,
   wherein the first plate comprises an insertion hole which penetrates the first plate from one surface to a remaining surface and into which the tool section is inserted, and a cut through-space configured to be pressed by adjusting a diameter of the insertion hole, and

wherein the connecting section further comprises a diameter adjusting bolt which passes through the through-space from an outside of a side surface of the first plate to be fastened to the first plate.

2. The device of claim 1, wherein the tool section comprises a main body comprising a rotary motor with a rotary shaft exposed to an outside, and a machining portion of which an outer peripheral surface is in contact with a surface of the pipe and one side is connected to the rotary shaft.

3. The device of claim 2, wherein the tool section further comprises a bearing that is disposed on a remaining side of the machining portion and has an inner diameter connected to the rotary shaft.

4. The device of claim 3, wherein the machining portion has an outer diameter larger than an outer diameter of the bearing, and has a predetermined inclination with respect to a longitudinal direction of the rotary shaft.

5. The device of claim 1, wherein a position of the tool section is adjustable in a longitudinal direction of the pipe.

6. The device of claim 1, wherein the roller section comprises a main body frame to which the surface roller and the connecting section are connected, and an elastic section that is connected to the main body frame and comprises an elastic roller configured to run on the outer surface of the pipe, and a pressing portion configured to press the elastic roller to the outer surface of the pipe.

7. The device of claim 6, wherein the surface roller and the elastic roller rotate in one direction.

8. The device of claim 6, wherein at least one of the surface roller and the elastic roller has a rotary shaft inclined at a predetermined angle with respect to an extension direction of the pipe to bring the main body frame into contact with a cross section of the pipe during rotating and advancing.

9. The device of claim 8, wherein the roller section further comprises a guide roller connected to the main body frame, provided on at least one of front and rear sides of the surface roller in an advancing direction, and configured to run on an end surface of the pipe in the extension direction.

10. The device of claim 1, wherein the second plate comprises a pipe diameter adjusting line formed by an area of a predetermined angle which penetrates the second plate from one surface to a remaining surface, wherein the connecting section further comprises a pipe diameter adjusting/fastening member fastened to the pipe diameter adjusting line and the roller section, wherein the second plate further comprises a stroke limiting ridge protruding on one surface of the second plate, wherein the first plate further comprises a stroke limiting recess provided on a remaining surface of the first plate to accommodate one side of the stroke limiting ridge, and wherein the stroke limiting recess has a position that is relatively variable with respect to the stroke limiting ridge.

11. The device of claim 6, wherein the surface roller and the elastic roller are arranged to face each other in a state in which each of the surface roller and the elastic roller is in contact with the outer surface of the pipe.

12. The device of claim 1, wherein a position of the surface roller where the surface roller is coupled on the roller section is changed.

13. A multifunctional pipe film removing device configured to remove a film from an inner or outer surface of a pipe, the device comprising:

a tool section configured to remove the film, wherein the tool section comprises a main body comprising a rotary motor with a rotary shaft exposed to an outside, and a machining portion of which an outer peripheral surface is in contact with a surface of the pipe and one side is connected to the rotary shaft, wherein the tool section further comprises a bearing that is disposed on a remaining side of the machining portion and has an inner diameter connected to the rotary shaft, wherein the machining portion has an outer diameter larger than an outer diameter of the bearing, and has a predetermined inclination with respect to a longitudinal direction of the rotary shaft;

a roller section comprising at least one surface roller running on the inner or outer surface of the pipe; and a connecting section comprising a first plate to which the tool section is connected, and a second plate disposed on an opposite side of the first plate, wherein the second plate is connected to the first plate via a single shaft and the roller section is connected to the second plate.

14. A multifunctional pipe film removing device configured to remove a film from an inner or outer surface of a pipe, the device comprising:

a tool section configured to remove the film;

a roller section comprising at least one surface roller running on the inner or outer surface of the pipe; and a connecting section comprising a first plate to which the tool section is connected, and a second plate disposed on an opposite side of the first plate, wherein the second plate is connected to the first plate via a single shaft and the roller section is connected to the second plate, wherein the first plate further comprises a first fastening hole which penetrates the first plate from one surface of a remaining surface, wherein the second plate further comprises a second fastening hole which communicates with the first fastening hole on an outside of a side surface of the second plate and penetrates the second plate toward the inner or outer surface of the pipe where the tool section is in contact, and wherein the connecting section comprises a first fastening member inserted into the first fastening hole, and a second fastening member inserted into the second fastening hole and having an end in contact with the other end of the first fastening member.

15. The device of claim 14, wherein the second fastening member comprises a first spring inserted into the second fastening hole, and an adjusting bolt mounted on the outside of the side surface of the second plate to adjust the elastic force of the first spring.

16. The device of claim 14, wherein the first plate further comprises a third fastening hole which penetrates the first plate from one surface of a remaining surface, wherein the second plate further comprises a bushing recess penetrating the second plate from one surface to a remaining surface and communicating with the third fastening hole, wherein the connecting section further comprises a third fastening member fastened to the third fastening hole, wherein the bushing recess has a predetermined area on one side where a diameter of the bushing recess increases toward one end of the bushing recess, and wherein the third fastening member has a predetermined area on a remaining side where a diameter of the third fastening member decreases toward a remaining end of the third fastening member, and further comprises a second spring installed on the first plate and wound around an outer peripheral surface on one side of the third fastening member.

\* \* \* \* \*